(12) United States Patent
Cheng

(10) Patent No.: US 11,548,389 B2
(45) Date of Patent: Jan. 10, 2023

(54) CONTROL SYSTEM AND SWITCH METHOD FOR SCREEN OF VEHICLE

(71) Applicant: Getac Technology Corporation, Hsinchu County (TW)

(72) Inventor: Hsueh-Mao Cheng, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 340 days.

(21) Appl. No.: 16/890,255

(22) Filed: Jun. 2, 2020

(65) Prior Publication Data

US 2021/0370771 A1 Dec. 2, 2021

(51) Int. Cl.
*B60K 35/00* (2006.01)
*G01S 19/52* (2010.01)
*G01S 19/39* (2010.01)
*G01P 15/18* (2013.01)
*G01P 15/08* (2006.01)

(52) U.S. Cl.
CPC .............. *B60K 35/00* (2013.01); *G01P 15/08* (2013.01); *G01P 15/18* (2013.01); *G01S 19/396* (2019.08); *G01S 19/52* (2013.01); *B60K 2370/152* (2019.05); *B60K 2370/195* (2019.05)

(58) Field of Classification Search
CPC .............. B60K 35/00; B60K 2370/152; B60K 2370/195; G01P 15/08; G01P 15/18; G01P 1/103; G01P 15/0891; G01S 19/396; G01S 19/52; G01S 5/011; G01S 19/49
See application file for complete search history.

(56) References Cited

U.S. PATENT DOCUMENTS

2016/0088146 A1\* 3/2016 Ying ................. H04M 1/72454
455/550.1

\* cited by examiner

*Primary Examiner* — Brian P Sweeney
(74) *Attorney, Agent, or Firm* — Locke Lord LLP; Tim Tingkang Xia, Esq.

(57) ABSTRACT

A control system for a screen of a vehicle includes a global positioning system (GPS), an inertia sensor and a control circuit. The GPS detects a satellite signal from a satellite. The inertia sensor senses motion of the vehicle and correspondingly generates a motion state value. The control circuit performs one of a first determination procedure and a second determination procedure according to the state of the satellite signal. In the first determination procedure, the control circuit calculates the vehicle speed of the vehicle according to the satellite signal, and selectively locks the screen of the vehicle according to the vehicle speed. In the second determination procedure, the control circuit generates a motion signal according to the motion state value, and selectively locks the screen of the vehicle according to the motion signal. Accordingly, driving safety can still be effectively ensured even in the case of poor satellite signals.

14 Claims, 4 Drawing Sheets

CONTROL SYSTEM AND SWITCH METHOD FOR SCREEN OF VEHICLE

BACKGROUND OF THE INVENTION

Field of the Invention

The present invention relates to a control technology for in-vehicle electronic devices and, more particularly, to a control system and a switch method for a screen of a vehicle.

Description of the Prior Art

Smart vehicles have become the mainstream in automobile development. To enable communications between a driver and a smart vehicle, various types of in-vehicle electronic devices providing diversified functions, e.g., satellite navigation, display of road conditions, audio/video playback and instant messaging, are usually equipped in a vehicle. However, in-vehicle screens are frequently needed to achieve these diversified functions or interactions.

In order to have an in-vehicle electronic device provide better operability, an in-vehicle screen further provides a touch control function in addition to a display function so as to achieve better performance.

SUMMARY OF THE INVENTION

However, a driver may be distracted and thus probabilities of traffic accidents are increased if the driver watches or operates an in-vehicle screen while driving. In view of the above, the present invention provides a control system and a switch method for a screen of a vehicle, thereby preventing a driver from distraction caused by operating or watching a screen in the case of an overly fast speed of a vehicle.

In some embodiments, a switch method for a screen of a vehicle includes detecting at least one satellite signal from at least one satellite, performing one of a first determination procedure and a second determination procedure according to the state of the at least one satellite signal, calculating a vehicle speed of the vehicle according to the at least one satellite signal and selectively locking the screen of the vehicle according to the vehicle speed in the first determination procedure, and generating a motion signal by an inertia sensor of the vehicle and selectively locking the screen of the vehicle according to the motion signal in the second determination procedure.

In some embodiments, the control system for a screen of a vehicle includes a GPS, an inertia sensor and a control circuit. The GPS detects at least one satellite signal from at least one satellite. The inertia sensor senses motion of the vehicle and correspondingly generates at least one motion state value. The control circuit, coupled to the GPS and the inertia sensor, performs one of a first determination procedure and a second determination procedure according to the state of the at least one satellite signal. In the first determination procedure, the control circuit calculates a vehicle speed of the vehicle according to the at least one satellite signal and selectively locks the screen of the vehicle according to the vehicle speed. In the second determination procedure, the control circuit generates a motion signal according to the at least one motion state value and selectively locks the screen of the vehicle according to the motion signal.

In conclusion, in the control system and switch method for a screen of a vehicle according to any of the embodiments, a determination mechanism is switched in response to the driving environment of the vehicle so as to detect the vehicle speed by different determination procedures and timely automatically lock the screen in response to the driving environment of the vehicle, thereby effectively ensuring driving safety.

DETAILED DESCRIPTION OF THE EMBODIMENTS

Figure 1:
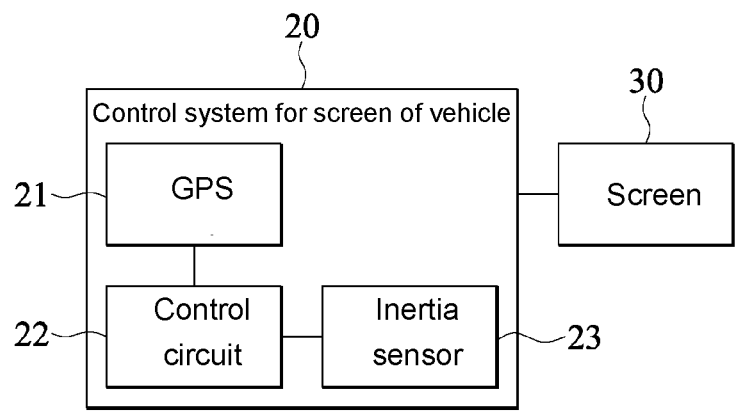
FIG. 1 is a block diagram of a control system for a screen of a vehicle according to an embodiment of the present invention.

Referring to FIG. 1, in some embodiments, a control system 20 for a screen of a vehicle includes a global positioning system (GPS) 21, an inertia sensor 23, and a control circuit 22. The control system 20 for a screen of a vehicle is connected to a screen 30. The control circuit 22 is coupled to the GPS 21, the inertia sensor 23 and the screen 30.

Figure 2:
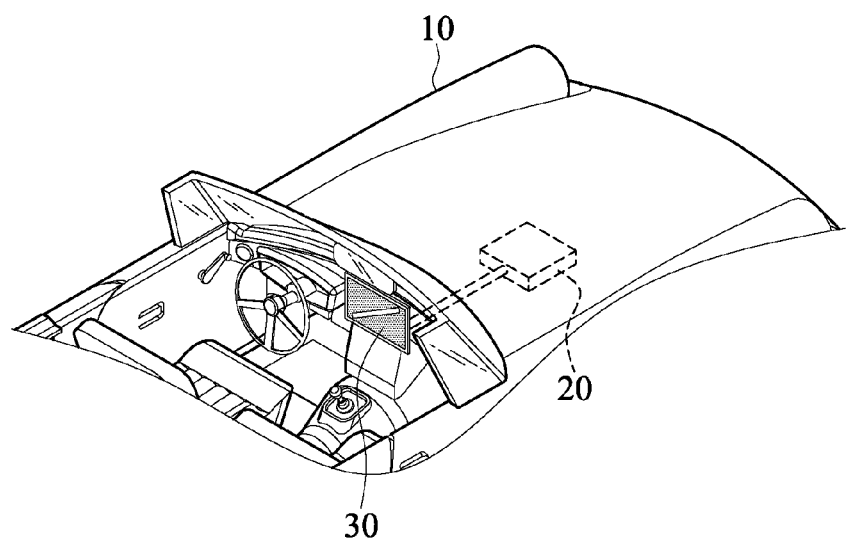
FIG. 2 is a schematic diagram of the control system for a screen of a vehicle in FIG. 1 applied to a vehicle.

Referring to FIG. 2, in some examples, the control system 20 for a screen of a vehicle may be applied in a vehicle. The vehicle may be various types of vehicles 10. In one example, the control system 20 for a screen of a vehicle is implemented by an in-vehicle electronic device equipped in the vehicle 10. In other words, the GPS 21, the inertia sensor 23 and the control circuit 22 are configured in the vehicle 10. For example, the GPS 21, the inertia sensor 23 and the control circuit 22 may be implemented by an on-board unit (OBU) in the vehicle 10. Furthermore, the screen 30 may be a dashboard or an embedded screen of the interior of the vehicle 10, as shown in FIG. 2.

In some other examples, the control system 20 for a screen of a vehicle may be implemented by a portable electronic device arranged in the vehicle 10. In other words, the GPS 21, the inertia sensor 23 and the control circuit 22 are configured on the portable electronic device. At this point in time, the screen 30 may be the screen of the portable electronic device, or the dashboard or an embedded screen of the interior of the vehicle 10. For example, the GPS 21, the inertia sensor 23, the control circuit 22 and the screen 30 are corresponding modules included in the portable electronic device. Herein, the portable electronic device may be selectively powered by the vehicle 10. In another example, the GPS 21, the inertia sensor 23 and the control circuit 22 may be corresponding modules included in the portable electronic device, and the screen 30 is an embedded screen included in the vehicle 10. Herein, the portable electronic device may be electrically connected to an OBU of the vehicle 10, so that the portable electronic device can timely generate and send a control signal to the OBU of the vehicle 10 in order to control the OBU to lock the embedded screen of the vehicle 10.

In another example, the control system 20 for a screen of a vehicle may also be implemented by the vehicle 10 and a portable electronic device arranged in the vehicle 10. In other words, at least one of the GPS 21, the inertia sensor 23 and the control circuit 22 is arranged on the portable electronic device, and the rest of the GPS 21, the inertia sensor 23 and the control circuit 22 are configured in the vehicle 10. At this point in time, the screen 30 may be the screen of the portable electronic device or the dashboard or an embedded screen of the interior of the vehicle 10. For example, the GPS 21 and the control circuit 22 may be corresponding modules included in the portable electronic device, and the inertia sensor 23 and the screen 30 are corresponding modules included in the vehicle 10. The portable electronic device may be electrically connected to the OBU of the vehicle 10 so as to access the inertia sensor 23 arranged in the vehicle 10 and to timely lock the embedded screen of the vehicle 10.

The portable electronic device may be, for example but not limited to, a vehicle navigation device, a smartphone or a tablet computer.

Figure 3:
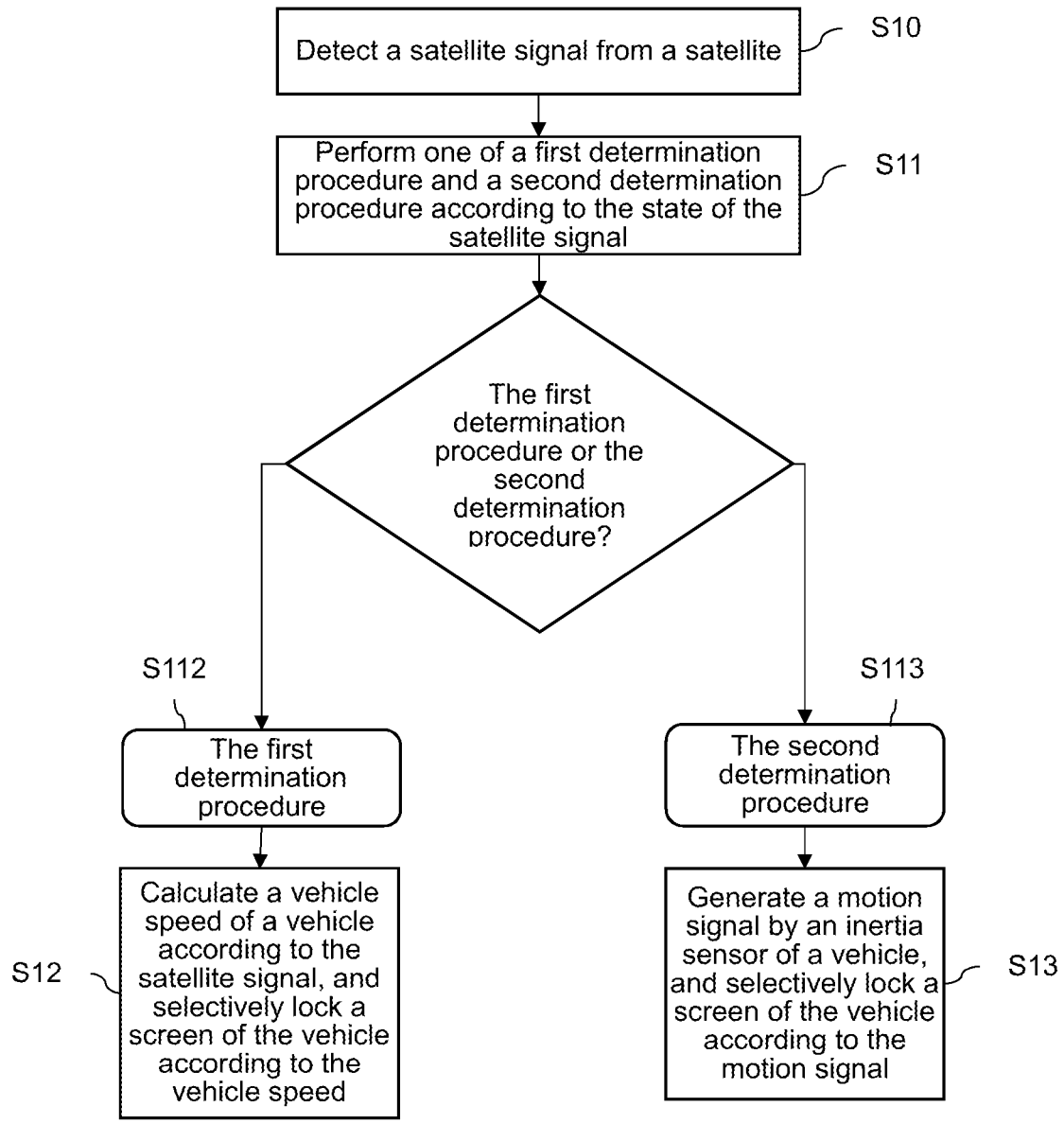
FIG. 3 is a flowchart of a switch method for a screen of a vehicle according to an embodiment of the present invention.

Referring to FIG. 3, to perform the switch method, the control system 20 for a screen of a vehicle first detects at least one satellite signal from at least one satellite by the GPS 21 (step S10). In some embodiments, the satellite recited in the description refers to, for example but not limited to, U.S.-based GPS satellites, Russia-based GION-ASS satellites, EU-based Galileo satellites, or Beidou China-based satellites.

Next, the control circuit 22 receives the satellite signal sent from the GPS 21, and performs one of a first determination procedure and a second determination procedure according to the state of the satellite signal (step S11). For example, the first determination procedure or the second determination procedure is performed according to data and validity of a National Marine Electronics Association (NMEA) code of the satellite.

When the control circuit 22 determines that the first determination procedure has to be performed, the control circuit 22 calculates the vehicle speed of the vehicle according to the satellite signal and selectively locks the screen 30 of the vehicle according to the vehicle speed (step S12). That is to say, if the control circuit 22 determines that the vehicle speed is too fast, for example, when the vehicle speed exceeds 20 km/S, the screen 30 of the vehicle is locked, so as to prevent dangers caused by the driver simultaneously operating or watching the screen 30 of the vehicle while driving at a high speed. In some embodiments, the state of the satellite signal includes the strength of the satellite signal and the quantity of satellites from which satellite signals are received.

If the control circuit 22 determines that the second determination procedure has to be performed, the control circuit 22 receives at least one motion state value generated by the inertia sensor 23 in the vehicle, generates a motion signal according to the received motion state value, and selectively locks the screen 30 of the vehicle according to the motion signal (step S13). That is to say, when the satellite signal is poor and thus the correct vehicle speed cannot be acquired or the vehicle speed may be misjudged, the control circuit 22 alternatively adopts the second determination procedure and uses information apart from non-satellite signals to determine the vehicle speed so as to determine whether to lock the screen 30. In some embodiments, the inertia sensor 23 senses motion of the vehicle and correspondingly generates the motion state value. Herein, the motion state value refers to one or more values of the motion state of the vehicle sensed by the inertia sensor 23.

Thus, the control system 20 for a screen of a vehicle can prevent influences of situations such as being blocked by high buildings, the climate changes and satellite damage that may cause failure or misjudgment in determining the vehicle speed.

Figure 4:
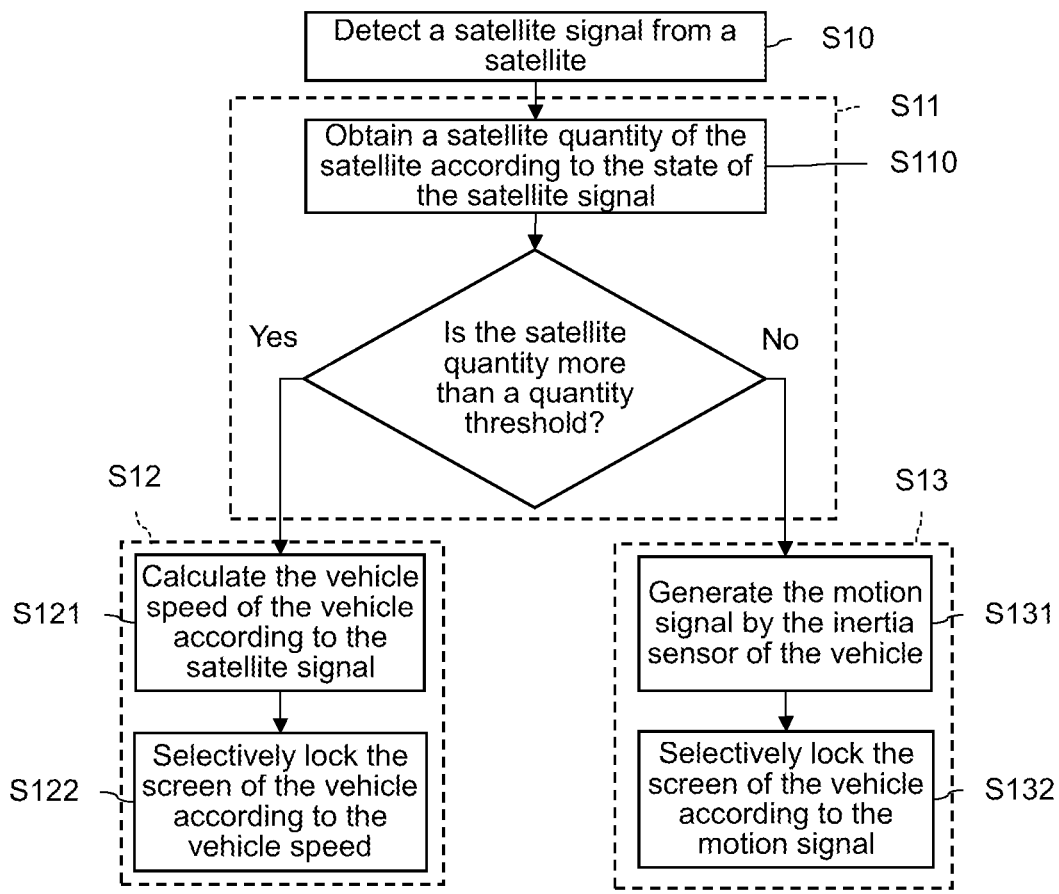
FIG. 4 is a detailed flowchart of an example of steps S11 to S13 in FIG. 3.

In some embodiments, the state of the satellite signal includes a satellite quantity of satellites from which the GPS 21 can receive satellite signals. Referring to FIG. 4, in some embodiments of step S11, the control circuit 22 obtains the satellite quantity of satellites according to the state of the satellite signal (step S110). Then, the control circuit 22 determines whether the satellite quantity obtained is more than a quantity threshold (step S111). If the satellite quantity is more than the quantity threshold, the control circuit 22 performs the first determination procedure (step S112); if the satellite quantity is not more than the quantity threshold, the control circuit 22 performs the second determination procedure (step S113).

In some embodiments, the satellite quantity and the quantity threshold are positive integers. In some embodiments, the quantity threshold is a positive integer more than 3. In some embodiments, satellite signals of at least three satellites need to be received in order to calculate the two-dimensional (2D) position (latitude and longitude) and trajectory movement of the vehicle, and hence the quantity threshold may be 3. In an example, in step S111, if the satellite quantity is more than or equal to 3, the control circuit 22 performs the first determination procedure, that is, continuing to perform step S12. In step S111, if the satellite quantity is less than 3 (that is, if the satellite quantity is 0 to 2), the control circuit 22 performs the second determination procedure, that is, continuing to perform step S13. In some embodiments, if the satellite quantity is more than 2 but the state of the satellite signals received by the GPS 21 is invalid, it is still determined that the satellite quantity is not more than 2, and the control circuit 22 performs the second determination procedure, that is, continuing to perform step S131. In some embodiments, satellite signals of at least four satellites need to be received in order to calculate the three-dimensional (3D) position (latitude, longitude and altitude) and motion state of the vehicle, and hence the quantity threshold may be 4.

Again referring to FIG. 4, in some embodiments of step S12, the control circuit 22 calculates the vehicle speed of the vehicle according to the satellite signal (step S121), and the control circuit 22 selectively locks the screen 30 of the vehicle according to the vehicle speed (step S122). In some embodiments, the first determination procedure in step S121 includes that the control circuit 22 calculates the vehicle speed of the vehicle according to differential GPS and the satellite signal, so as to acquire a more accurate vehicle speed.

In some embodiments of step S13, the control circuit 22 generates the motion signal by the inertia sensor 23 of the vehicle (step S131), and the control circuit 22 selectively locks the screen 30 of the vehicle according to the motion signal (step S132).

In some embodiments, step S10 to step S13 are iterated. That is to say, the switch method for a screen of a vehicle is repeatedly implemented to again determine whether to lock the screen 30. For example, step S10 and subsequent steps are iterated after completing step S12 and step S13. Alternatively, after completing step S12 and step S13, step S10 and subsequent steps are iterated only after an interval of a time period.

Figure 5:
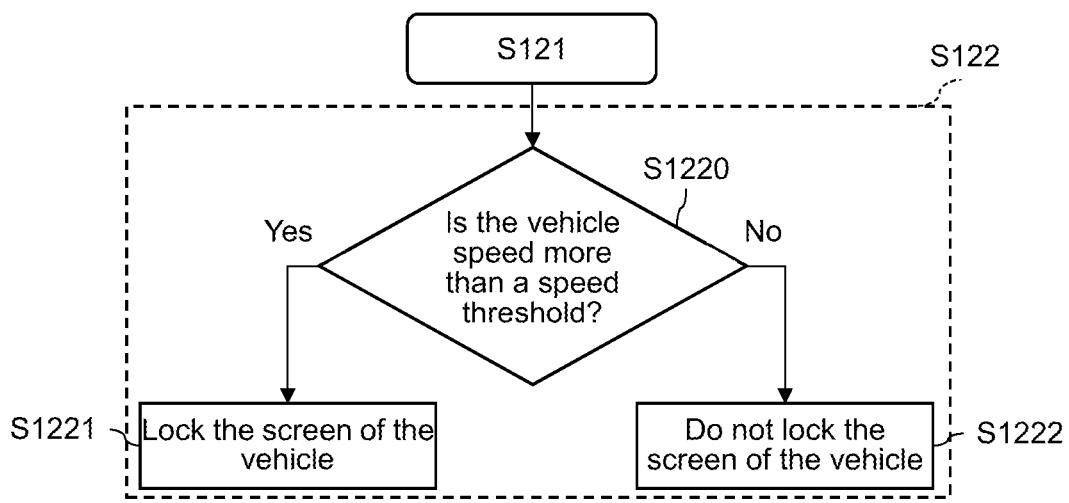
FIG. 5 is a detailed flowchart of an example of step S122 in FIG. 4.

FIG. 5 shows a detailed flowchart of an example of step S122 in FIG. 4. Referring to FIG. 5, in one embodiment, the control circuit 22 determines, after determining that the first determination procedure has to be performed (step S112), whether the vehicle speed is more than a speed threshold (step S1220). If so, that is, if the vehicle speed is more than the speed threshold, the control circuit 22 locks the screen 30 of the vehicle (step S1221). If not, that is, the vehicle speed is not more than the speed threshold, the control circuit 22 does not lock the screen 30 of the vehicle (step S1222).

In some embodiments, step S100 is iterated after step S1221 and step S1222, that is, the state of the satellite signals is cyclically determined. In some embodiments, after step S1221 and step S1222, an original state of the screen 30 is maintained for a time period before returning to step S100; that is to say, the state of the satellite signal is determined once at an interval of a time period.

Figure 6:
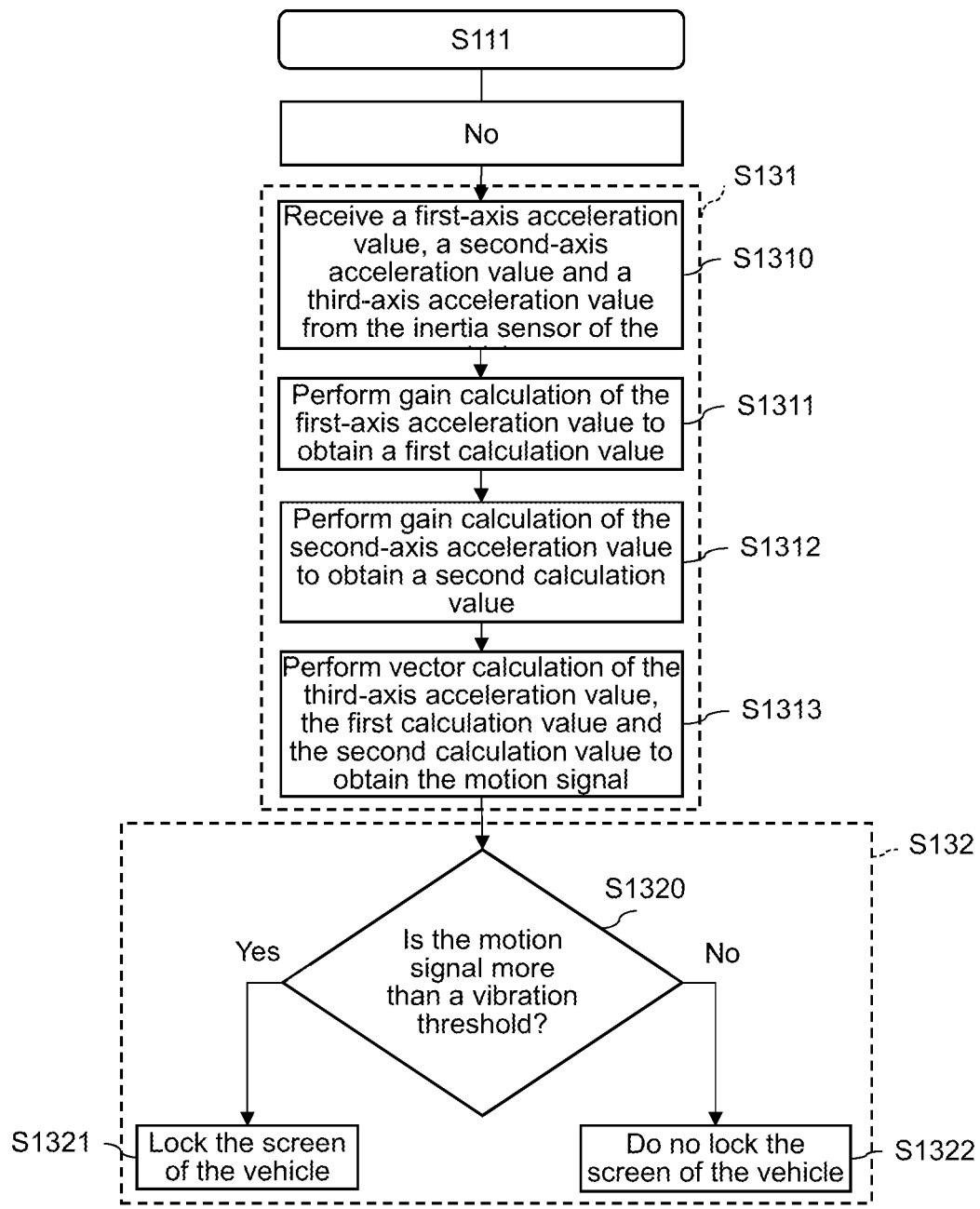
FIG. 6 is a detailed flowchart of an example of steps S131 and S132 in FIG. 4.

FIG. 6 shows a detailed flowchart of an example of step S131 and S132 in FIG. 4. Referring to FIG. 6, in some embodiments, step S131 further includes the control circuit 22 receiving a first-axis acceleration value, a second-axis acceleration value and a third-axis acceleration value from the inertia sensor 23 (step S1310). In some embodiments, the inertia sensor 23 is implemented by a three-axis accelerometer sensor. In some embodiments, the first-axis acceleration value and the second-axis acceleration value are any two selected from an X-axis acceleration value, a Y-axis acceleration value and the Z-axis acceleration value. In some embodiments, the first-axis acceleration value and the second-axis acceleration value are any two selected from an X-axis acceleration value, a Y-axis acceleration value and the Z-axis acceleration value according to a progressing direction of the vehicle and the top-down direction of the vehicle.

The control circuit 22 performs gain calculation of the first-axis acceleration value to obtain a first calculation value (step S1311), and the control circuit 22 performs gain calculation of the second-axis acceleration value to obtain a second calculation value (step S1312). In some embodiments, the gain calculation means amplifying the first-axis acceleration value or the second-axis acceleration value by a gain of more than four times. In some embodiments, the gain calculation means multiplying the first-axis acceleration value or the second-axis acceleration value by four. The gain calculation facilitates subsequent calculation and operation settings.

Next, the control circuit 22 performs vector calculation of the third-axis acceleration value, the first calculation value and the second calculation value to obtain the motion signal (step S1313). In some embodiments, the vector calculation means performing summation calculation of the third-axis acceleration value, the first calculation value and the second calculation value to obtain the motion signal.

In an example, a represents the third-axis acceleration value, b represents the first calculation value and c represents the second calculation value. The square of a, the square of b and the square of c are added up, and the root of the sum of the three is calculated to obtain the motion signal. Herein, the motion signal is represented as $|\vec{A}|$.

Thus, the calculation equation thereof is:

$$|\vec{A}| = \sqrt[2]{a^2 + b^2 + c^2}$$

In the following step S1320, the control circuit 22 compares the motion signal with a predetermined vibration threshold. If the motion signal is more than the vibration threshold, the control circuit 22 locks the screen 30 of the vehicle (step S1321); conversely, if the motion signal is not more than the vibration threshold, the control circuit 22 does not lock the screen 30 of the vehicle (step S1322). In some embodiments, the vibration threshold may be adjusted according to requirements.

In some embodiments, locking the screen 30 of the vehicle means one of suspending the touch function of the screen 30, suspending the display function of the screen 30, and displaying some predetermined display images of the screen 30, or simultaneously suspending these functions of the screen 30, so as to keep the screen 30 in a locked state. Furthermore, not locking the screen 30 means allowing various functions (e.g., the touch control function and display function) of the screen 30 to operate normally, so as to keep the screen 30 in a normal state. In some embodiments, not locking the screen 30 in step S122, step S132, step S1222 and step S1322 may be releasing a current locked state of the screen 30 (that is, switching the operation state of the screen 30 from a locked state to a normal state), or maintaining a current unlocked state of the screen 30 (that is, maintaining the operation state of the screen 30 in a normal state). In some embodiments, locking the screen 30 in step S1221 and step S1321 may be switching the operation state of the screen 30 from a normal state to a locked state until it is determined in a subsequent period that the screen 30 is no longer locked, switching the operation state of the screen 30 from a normal state to a locked state for a period, or maintaining a current locked state of the screen 30.

In some embodiments, the control circuit 22 may be implemented by, for example but not limited to, a central processing unit (CPU), a system-on-chip (SoC), a microprocessing unit (MCU), an integrated circuit (IC) or a microprocessor.

In some embodiments, the motion state value may be one or more of values of acceleration, inclination, impact, vibration, rotation and degree-of-freedom (DoF) motion.

In some embodiments, the inertia sensor 23 is implemented by at least one of an accelerometer sensor, a gyroscope, an optical fiber gyroscope, a laser gyroscope and a microelectromechanical system (MEMS) gyroscope.

It should be noted that, the sequences of the steps provided in the description above are not to be construed as limitations to the present invention, and it is to be understood by a person skilled in the art that execution sequences of some of the steps may be simultaneously performed or exchanged under reasonable conditions.

While the present invention has been disclosed by way of preferred embodiments above, it is to be understood that the present invention is not limited thereto. Modifications and variations made by a person skilled in the art without departing from the spirit of the present invention are to be encompassed within the scope of the present invention. Therefore, the legal protection for the present invention should be defined by the appended claims.

What is claimed is:

1. A switch method for a screen of a vehicle, comprising:
   detecting at least one satellite signal from at least one satellite;
   performing one of a first determination procedure and a second determination procedure according to a state of the at least one satellite signal;
   in the first determination procedure, calculating a vehicle speed of the vehicle according to the at least one satellite signal, and selectively locking the screen of the vehicle according to the vehicle speed; and in the second determination procedure, generating a motion signal by an inertia sensor of the vehicle, and selectively locking the screen of the vehicle according to the motion signal, wherein the step of generating the motion signal by the inertia sensor of the vehicle comprises:
receiving a first-axis acceleration value, a second-axis acceleration value and a third-axis acceleration value from the inertia sensor of the vehicle;
performing gain calculation of the first-axis acceleration value to obtain a first calculation value;
performing gain calculation of the second-axis acceleration value to obtain a second calculation value; and
performing vector calculation of the third-axis acceleration value, the first calculation value and the second calculation value to obtain the motion signal.

2. The switch method for a screen of a vehicle according to claim 1, wherein the step of performing one of the first determination procedure and the second determination procedure according to the state of the at least one satellite signal comprises:
obtaining a satellite quantity of the at least one satellite according to the state of the at least one satellite signal;
comparing the satellite quantity with a quantity threshold;
performing the first determination procedure if the satellite quantity is more than the quantity threshold; and
performing the second determination procedure if the satellite quantity is not more than the quantity threshold.

3. The switch method for a screen of a vehicle according to claim 1, wherein the step of selectively locking the screen of the vehicle according to the vehicle speed comprises:
comparing the vehicle speed with a speed threshold;
locking the screen of the vehicle if the vehicle speed is more than the speed threshold; and
not locking the screen of the vehicle if the vehicle speed is not more than the speed threshold.

4. The switch method for a screen of a vehicle according to claim 1, wherein the step of selectively locking the screen of the vehicle according to the motion signal comprises:
comparing the motion signal with a vibration threshold;
locking the screen of the vehicle if the motion signal is more than the vibration threshold; and
not locking the screen of the vehicle if the motion signal is not more than the vibration threshold.

5. The switch method for a screen of a vehicle according to claim 1, wherein the step of performing the vector calculation of the third-axis acceleration value, the first calculation value and the second calculation value to obtain the motion signal is calculated according to an equation:

$$|\vec{A}|=\sqrt[2]{a^2+b^2+c^2};$$

where $|\vec{A}|$ represents the motion signal, a represents the third-axis acceleration value, b represents the first calculation value, and c represents the second calculation value.

6. A control system for a screen of a vehicle, comprising:
a global positioning system (GPS), detecting at least one satellite signal from at least one satellite;
an inertia sensor, sensing motion of a vehicle and correspondingly generating at least one motion state value; and
a control circuit, coupled to the GPS and the inertia sensor, performing one of a first determination procedure and a second determination procedure according to a state of the at least one satellite signal;

wherein, in the first determination procedure, the control circuit calculates a vehicle speed of the vehicle according to the at least one satellite signal and selectively locks the screen of the vehicle according to the vehicle speed; in the second determination procedure, the control circuit generates a motion signal according to the at least one motion state value and selectively locks the screen of the vehicle according to the motion signal, wherein the at least one motion state value comprises a first-axis acceleration value, a second-axis acceleration value and a third-axis acceleration value; the control circuit realizes the generating the motion signal according to the at least one motion state value by:
receiving the first-axis acceleration value, the second-axis acceleration value and the third-axis acceleration value from the inertia sensor of the vehicle;
performing gain calculation of the first-axis acceleration value to obtain a first calculation value;
performing gain calculation of the second-axis acceleration value to obtain a second calculation value; and
performing vector calculation of the third-axis acceleration value, the first calculation value and the second calculation value to obtain the motion signal.

7. The control system for a screen of a vehicle according to claim 6, wherein the control circuit realizes the performing one of the first determination procedure and the second determination procedure according to the state of the at least one satellite signal by:
obtaining a satellite quantity of the at least one satellite according to the state of the at least one satellite signal;
comparing the satellite quantity with a quantity threshold;
performing the first determination procedure if the satellite quantity is more than the quantity threshold; and
performing the second determination procedure if the satellite quantity is not more than the quantity threshold.

8. The control system for a screen of a vehicle according to claim 6, wherein the control circuit realizes the selectively locking the screen of the vehicle according to the vehicle speed by:
comparing the vehicle speed with a speed threshold;
locking the screen of the vehicle if the vehicle speed is more than the speed threshold; and
not locking the screen of the vehicle if the vehicle speed is not more than the speed threshold.

9. The control system for a screen of a vehicle according to claim 6, wherein the control circuit realizes the selectively locking the screen of the vehicle according to the motion signal by:
comparing the motion signal with a vibration threshold;
locking the screen of the vehicle if the motion signal is more than the vibration threshold; and
not locking the screen of the vehicle if the motion signal is not more than the vibration threshold.

10. The control system for a screen of a vehicle according to claim 7, wherein the control circuit realizes the performing vector calculation of the third-axis acceleration value, the first calculation value and the second calculation value to obtain the motion signal according to an equation:

$$|\vec{A}|=\sqrt[2]{a^2+b^2+c^2};$$

where $|\vec{A}|$ represents the motion signal, a represents the third-axis acceleration value, b represents the first calculation value, and c represents the second calculation value.

11. A control system for a screen of a vehicle, comprising:
a global positioning system (GPS), detecting at least one satellite signal from at least one satellite;
an inertia sensor, sensing motion of a vehicle and correspondingly generating at least one motion state value; and
a control circuit, coupled to the GPS and the inertia sensor, performing one of a first determination procedure and a second determination procedure according to a state of the at least one satellite signal;
wherein, in the first determination procedure, the control circuit calculates a vehicle speed of the vehicle according to the at least one satellite signal and selectively locks the screen of the vehicle according to the vehicle speed; in the second determination procedure, the control circuit generates a motion signal according to the at least one motion state value and selectively locks the screen of the vehicle according to the motion signal,
wherein the control circuit realizes the selectively locking the screen of the vehicle according to the motion signal by:
comparing the motion signal with a vibration threshold;
locking the screen of the vehicle if the motion signal is more than the vibration threshold; and
not locking the screen of the vehicle if the motion signal is not more than the vibration threshold.

12. The control system for a screen of a vehicle according to claim 11, wherein the control circuit realizes the performing one of the first determination procedure and the second determination procedure according to the state of the at least one satellite signal by:
obtaining a satellite quantity of the at least one satellite according to the state of the at least one satellite signal;
comparing the satellite quantity with a quantity threshold;
performing the first determination procedure if the satellite quantity is more than the quantity threshold; and
performing the second determination procedure if the satellite quantity is not more than the quantity threshold.

13. The control system for a screen of a vehicle according to claim 11, wherein the control circuit realizes the selectively locking the screen of the vehicle according to the vehicle speed by:
comparing the vehicle speed with a speed threshold;
locking the screen of the vehicle if the vehicle speed is more than the speed threshold; and
not locking the screen of the vehicle if the vehicle speed is not more than the speed threshold.

14. The control system for a screen of a vehicle according to claim 11, wherein the at least one motion state value comprises a first-axis acceleration value, a second-axis acceleration value and a third-axis acceleration value; the control circuit realizes the generating the motion signal according to the at least one motion state value by:
receiving the first-axis acceleration value, the second-axis acceleration value and the third-axis acceleration value from the inertia sensor of the vehicle;
performing gain calculation of the first-axis acceleration value to obtain a first calculation value;
performing gain calculation of the second-axis acceleration value to obtain a second calculation value; and
performing vector calculation of the third-axis acceleration value, the first calculation value and the second calculation value to obtain the motion signal according to an equation:

$$|\vec{A}| = \sqrt{a^2 + b^2 + c^2};$$

where $|\vec{A}|$ represents the motion signal, a represents the third-axis acceleration value, b represents the first calculation value, and c represents the second calculation value.

* * * * *